US009836401B2

(12) United States Patent
Lee et al.

(10) Patent No.: US 9,836,401 B2
(45) Date of Patent: Dec. 5, 2017

(54) MULTI-CORE SIMULATION SYSTEM AND METHOD BASED ON SHARED TRANSLATION BLOCK CACHE

(71) Applicant: ELECTRONICS AND TELECOMMUNICATIONS RESEARCH INSTITUTE, Daejeon (KR)

(72) Inventors: Jae-Jin Lee, Daejeon (KR); Kyung Jin Byun, Daejeon (KR); Nak Woong Eum, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/222,940

(22) Filed: Jul. 28, 2016

(65) Prior Publication Data

US 2017/0192885 A1 Jul. 6, 2017

(30) Foreign Application Priority Data

Jan. 5, 2016 (KR) ........................ 10-2016-0001008

(51) Int. Cl.
*G06F 12/08* (2016.01)
*G06F 12/084* (2016.01)
(Continued)

(52) U.S. Cl.
CPC .......... *G06F 12/084* (2013.01); *G06F 9/3017* (2013.01); *G06F 12/0842* (2013.01);
(Continued)

(58) Field of Classification Search
CPC .. G06F 12/084; G06F 9/3017; G06F 12/0842; G06F 12/0875
(Continued)

(56) References Cited

U.S. PATENT DOCUMENTS 7,805,710 B2 * 9/2010 North .................. G06F 9/45516 711/118
8,850,166 B2 * 9/2014 Jacobi ................... G06F 9/3004 712/225
(Continued)

FOREIGN PATENT DOCUMENTS

KR 2013-0112180 A 10/2013

*Primary Examiner* — Stephen Elmore
(74) *Attorney, Agent, or Firm* — Rabin & Berdo, P.C.

(57) ABSTRACT

Provided is a multi-core simulation method including allocating, to a working memory, a shared translation block cache commonly used for a plurality of core models, reading a first target instruction to be performed in a first core model, generating a first translation block corresponding to the first target instruction and provided with an instruction set used in a host processor, performing the first translation block in the first core model after the first translation block is stored in the shared translation block cache, reading a second target instruction to be performed in a second core model, searching the shared translation block cache for a translation block including same content as that of the second target instruction, and performing the first translation block in the second core model, when the first target instruction includes same content as that of the second target instruction.

12 Claims, 6 Drawing Sheets

(51) Int. Cl.
*G06F 9/30* (2006.01)
*G06F 12/0842* (2016.01)
*G06F 12/0875* (2016.01)

(52) U.S. Cl.
CPC .... *G06F 12/0875* (2013.01); *G06F 2212/452* (2013.01); *G06F 2212/62* (2013.01)

(58) Field of Classification Search
USPC ......... 711/130, 147, 156, 202; 712/216, 225
See application file for complete search history.

(56) References Cited

U.S. PATENT DOCUMENTS

| | | | | |
|---|---|---|---|---|
| 9,043,194 | B2 * | 5/2015 | Nair | G06F 12/1027 703/23 |
| 9,501,311 | B2 * | 11/2016 | Lee | G06F 9/455 |
| 2011/0138157 | A1 * | 6/2011 | Ni | G06F 17/5072 712/225 |
| 2013/0132062 | A1 | 5/2013 | Hieda | |
| 2013/0339672 | A1 * | 12/2013 | Jacobi | G06F 9/30 712/220 |
| 2014/0115306 | A1 * | 4/2014 | Jacobi | G06F 9/30 712/245 |
| 2015/0186184 | A1 | 7/2015 | Kim | |
| 2015/0212849 | A1 * | 7/2015 | Lee | G06F 9/461 718/108 |
| 2016/0110209 | A1 * | 4/2016 | Lee | G06F 9/5011 703/26 |

* cited by examiner

MULTI-CORE SIMULATION SYSTEM AND METHOD BASED ON SHARED TRANSLATION BLOCK CACHE

CROSS-REFERENCE TO RELATED APPLICATIONS

This U.S. non-provisional patent application claims priority under 35 U.S.C. §119 to Korean Patent Application No. 10-2016-0001008, filed on Jan. 5, 2016, the entire contents of which are hereby incorporated by reference.

BACKGROUND

The present disclosure herein relates to a simulation system, and more particularly, to a multi-core simulation system and method based on a shared translation block cache.

As various next generation smartphones, portable devices, and smart TVs, etc., emerge, a technique related to development of a fusion processor, in which a multi-core processor and a graphic accelerator are integrated, is being proposed to support for processing various tangible graphics in 2D/3D.

A processor being currently used in a smartphone has evolved from a typical single core to current dual cores, and when viewed from processor development and a trend of device miniaturization, it is expected to evolve to a multi-core type of quad-cores or more. In addition, in a next generation mobile terminal, a multi-core processor, in which dozens to hundreds processors are integrated, is expected to enable biometrics and augmented reality.

A typical processor speeds up a clock to improve performance, but there is a limitation in that it is difficult to raise a speed more since power consumption becomes greater and heat increases accordingly. Since a multi-core processor proposed to address such a limitation includes several cores, an individual core may operate at a lower frequency and power consumed by a single core may be dispersed to other cores.

Since mounting a multi-core processor is the same as mounting two or more central processing units, when a task is performed with a program for supporting the multi-core processor, the task may be performed faster than a case with a single core processor and performance higher than that of the single core processor may be secured in a task such as compression and reconstruction of a video, execution of high specification game, or realization of augmented realty in a next generation mobile terminal, which basically performs multimedia-processing.

In order to develop an optimal SoC structure based on the multi-core processor, a design methodology of a virtual platform-based system level is required to analyze early a function and performance of an SoC at an upper level, and the most important core element in designing a virtual platform is to design an emulator, which models a multi-core function at a function-accurate level.

SUMMARY

The present disclosure provides a shared translation block cache-based multi-core simulation system and method for rapidly simulating a plurality of core models.

An embodiment of the inventive concept provides a multi-core simulation method of a multi-core simulation system, which includes a multi-core simulator configured to perform simulation on a plurality of core models and a host processor configured to perform the multi-core simulator. The multi-core simulation method includes: allocating, to a working memory, a shared translation block cache commonly used for the plurality of core models; reading a first target instruction to be performed in a first core model; generating a first translation block corresponding to the first target instruction and provided with an instruction set used in the host processor; performing the first translation block in the first core model after the first translation block is stored in the shared translation block cache; reading a second target instruction to be performed in a second core model; searching the shared translation block cache for a translation block including same content as that of the second target instruction; and performing the first translation block in the second core model, when the first target instruction includes same content as that of the second target instruction.

In an embodiment, the multi-core simulation method may further includes: reading a third target instruction to be performed in a third core model; searching the shared translation block cache for a translation block including same content as that of the third target instruction; generating a second translation block provided with an instruction set used in the host processor, when a translation block including same content as that of the third target instruction is not in the shared translation block cache; and performing the second translation block in the third core model after the second translation block is stored in the shared translation block cache.

In an embodiment, in the reading of the first and second target instructions, the multi-core simulator may calculate feature values respectively corresponding to the first and second target instructions.

In an embodiment, the multi-core simulator may search the shared translation block cache for a translation block corresponding to each target instruction on a basis of the feature values.

In an embodiment, the shared translation block cache may store the translation blocks in a linked list according to an input sequence.

In an embodiment, the shared translation block cache may store the translation blocks in a binary tree structure on the basis of feature values respectively corresponding to the target instructions.

In an embodiment, the first and second target instructions may be configured with a binary code.

In an embodiment, the first target instruction may be translated to the first translation block provided with an instruction set used in the host processor through a disassemble process.

In an embodiment, the first and second target instructions may be generated by the host processor which compiles C code to be executed in the first and second core models.

In an embodiment of the inventive concept, a multi-core simulation system includes: a host processor configured to execute a multi-core simulator configured to simulate a plurality of core models; and a working memory in which target instructions performed in the multi-core simulator and the core models are loaded and which includes a shared translation block cache commonly used in the core models, wherein the shared translation block cache stores translation blocks generated by translating the target instructions and provided with instruction sets used in the host processor, and the multi-core simulator searches the shared translation block cache for a first translation block corresponding to the first target instruction when the first target instruction is performed in any one of the core models, and executes the first translation block without translating the first target instruction when the first translation block exists.

In an embodiment, the multi-core simulator may translate the first target instruction to the first translation block and stores the first translation block in the shared translation block cache, when the first translation block does not exist in the shared translation block cache.

In an embodiment, the multi-core simulator may calculate a feature value from the first target instruction and search the shared translation block cache for the first translation block on a basis of the feature value.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
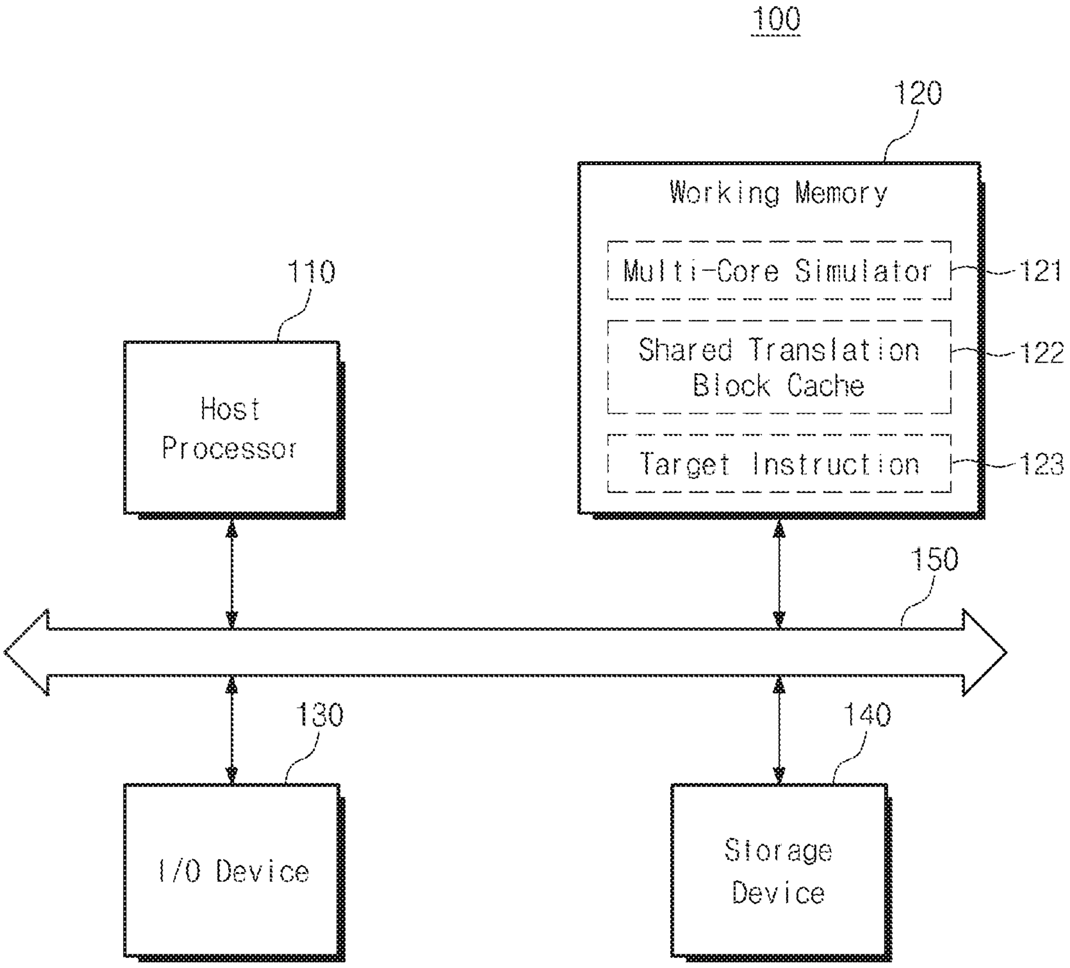
FIG. 1 is a block diagram illustrating a multi-core simulation system according to an embodiment of the inventive concept.

Advantages and features of the present invention, and methods for achieving the same will be cleared with reference to exemplary embodiments described later in detail together with the accompanying drawings. Accordingly, the present invention is not limited to the following embodiments but embodied in other types. Rather, these embodiments are provided so that this disclosure will be thorough, and convey the technical idea of the present disclosure to those skilled in the art.

In the drawings, embodiments of the inventive concept are not limited to the specific examples provided herein and are exaggerated for clarity. In addition, same reference numerals denote same elements throughout the specification.

Although specific terms are used herein, they are just used for describing the present disclosure, but do not limit the meanings and the scope of the present invention disclosed in the claims. As used herein, the term "and/or" includes any and all combinations of one or more of the associated listed items. In addition, it will be understood that when an element is referred to as being "connected" or "coupled" to another element, it may be directly connected or coupled to the other element or intervening elements may be present. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. Hereinafter, exemplary embodiments of the inventive concept will be described in detail with reference to the accompanying drawings.

FIG. 1 is a block diagram illustrating a multi-core simulation system according to an embodiment of the inventive concept. Referring to FIG. 1, a multi-core simulation system 100 may include a host processor 110, a working memory 120, an input/output device 130, and a storage device 140.

The host processor 110 executes software (e.g. an application program, an operating system, device drivers) to be performed in the multi-core simulation system 100. The host processor 110 may execute an operating system (OS, not illustrated) loaded in the working memory 120. The host processor 110 may execute various application programs or emulators to be driven on the basis of OS. For example, the host processor 110 may drive a multi-core simulator 121 loaded in the working memory 120.

An OS or application programs may be loaded in the working memory 120. At the time of booting the multi-core simulation system 100, an OS image (not illustrated) stored in the storage device 140 may be loaded in the working memory 120 on the basis of a booting sequence. All input/output operations of the multi-core simulation system 100 may be supported by the OS. Similarly, application programs, which are selected by a user or are to provide basic services, may be loaded in the working memory 120. In particular, the multi-core simulator 121 and a target instruction 123 according to the inventive concept may be loaded in the working memory 120. The working memory 120 may be a volatile memory such as a static random access memory (SRAM) or a dynamic random access memory (DRAM), or a nonvolatile memory such as a phase-change RAM (PRAM), a magnetoresistive RAM (MRAM), a resistive RAM (ReRAM), a ferroelectric RAM (FRAM), or a NOR flash memory.

The multi-core simulator 121 may be a program for simulating a plurality of core models. The multi-core simulator 121 may include a simulation model for the plurality of core models. The multi-core simulator 121 may read an instruction set to be executed in a target core from the target instruction 123 of a binary code type. The multi-core simulator 121 may generate a translation block corresponding to the target instruction 123 on the basis of the instruction set of the target core. The translation block may be stored in a shared translation block cache 122.

Translation blocks may be configured with instruction sets used in the host processor 110. The multi-core simulator 121 may store the translation blocks in the shared translation block cache 122 and use the stored translation blocks to perform simulation on the same target instruction 123. Accordingly, a simulation time may be shortened than a case where the multi-core simulator 121 disassembles the target instruction 123 every time. Such a method is defined as dynamic code translation.

For example, the multi-core simulator 121 may search the shared translation block cache 122 for a translation block corresponding to the target instruction 123 on the basis of the instruction set of the target core. When there is the translation block corresponding to the target instruction 123, the multi-core simulator 121 may execute the translation block in a target core corresponding thereto. When there is not the translation block corresponding to the target instruction 123, the multi-core simulator 121 may perform a disassemble process on the target instruction 123 to generate the translation block and store the translation block in the shared translation block cache 122.

In addition, the multi-core simulator 121 may allocate one shared translation block cache 122 to a plurality of core models. For example, a translation block generated for simulating any one of the core models may be used for simulating the remaining core models. In other words, the plurality of core models may share one shared translation block cache 122. Accordingly, in comparison to a case where each translation block cache is allocated to each core model, the multi-core simulator 121 may reduce the number of times of a disassembling process for converting the target instruction 123 into a translation block.

The input/output device 130 controls user inputs and outputs from user interface devices. For example, the input/output device 130 may be provided with input devices such as a keyboard, a mouse, and a touch pad and an output device such as a monitor or the like, and receive C code for generating the target instruction 123.

The storage device 140 is provided as a storage medium of the multi-core simulation system 100. For example, the storage device 140 may store application programs, OS images and various kinds of data. In addition, the storage device 140 may store the multi-core simulator 121 for performing multi-core simulation and C code for generating the target instruction 123. The storage device 140 may be provided as a memory card (e.g. MMC, eMMC, SD, MicroSD, or the like) or a hard disk drive (HDD). The storage device 140 may include a NAND-type flash memory having the large capacity storage capability. Alternatively, the storage device 140 may also include a next generation nonvolatile memory such as a PRAM, a ReRAM, an FRAM, or the like, or a NOR flash memory.

A system bus 150 may be provided as an inter-connector for providing a network inside the multi-core simulation system 100. The host processor 110, the working memory 120, the input/output device 130, and the storage device 140 may be electrically connected to each other and exchange data through the system bus 150. However, the configuration of the system bus 150 is not limited to the above description and may further include mediational means for efficient management.

According to the above-description, the multi-core simulation system 100 according to an embodiment of the inventive concept may share the shared translation block cache 122 between core models, which are to be simulation targets. Accordingly, a simulation time may be shortened than a case where the multi-core simulation system 100 allocates a translation block cache to each of the core models, which are to be the simulation targets.

Figure 2:
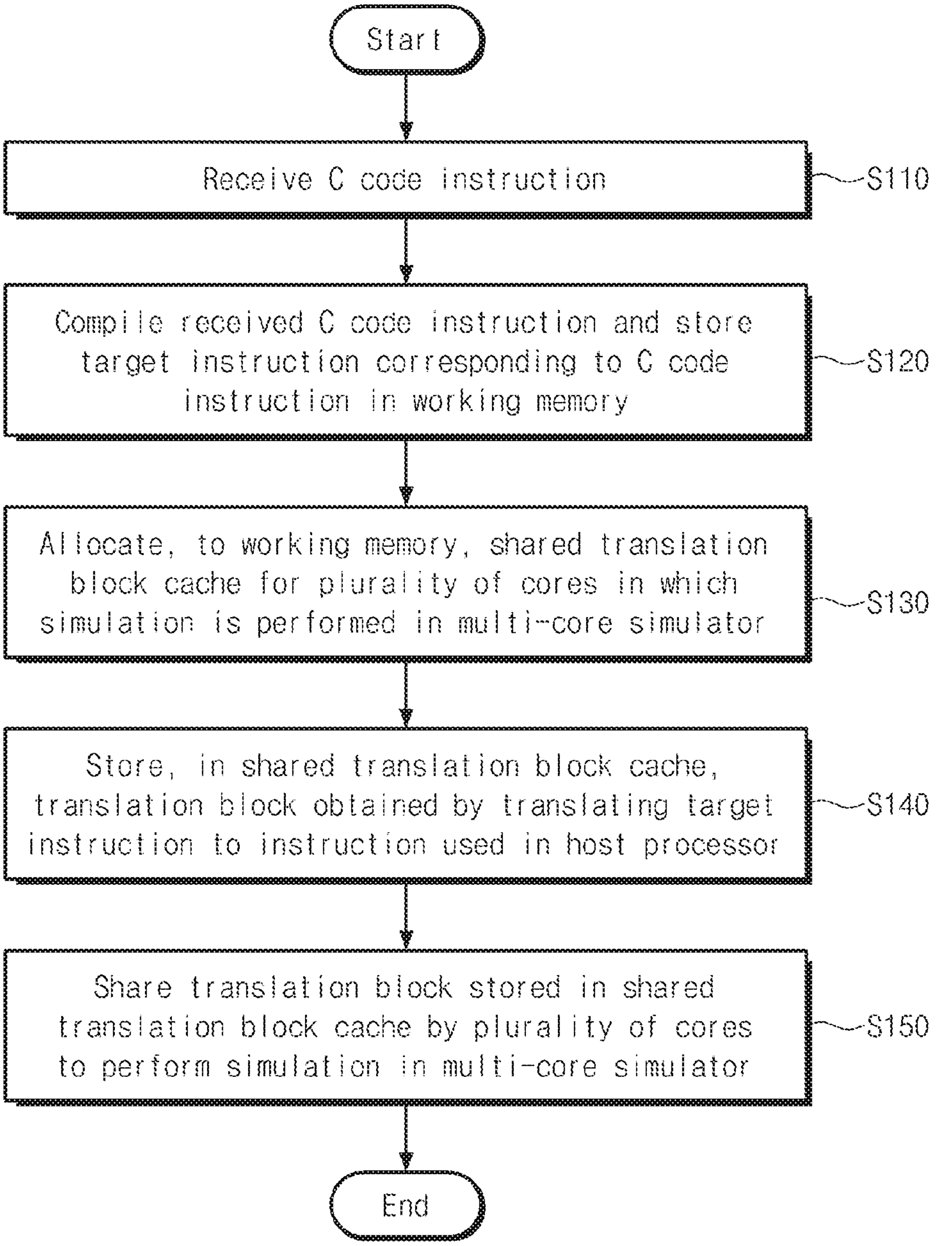
FIG. 2 is a flowchart illustrating a multi-core simulation method according to an embodiment of the inventive concept.

FIG. 2 is a flowchart illustrating a multi-core simulation method according to an embodiment of the inventive concept. Referring to FIGS. 1 and 2, the multi-core simulation system 100 may more rapidly perform simulation on a plurality of cores.

In operation S110, the host processor 110 may receive C code instructions. For example, the host processor 110 may receive C code instructions through the input/output device 130. In addition, the host processor 110 may load C code instructions stored in the storage device 140.

In operation S120, the host processor 110 may compile the received C code instructions to generate the target instruction 123. For example, the target instructions 123 may be a machine language formed of a binary code.

In operation S130, the host processor 110 executes the multi-core simulator 121 to allocate, to the working memory 120, the shared translation block cache 122 for a plurality of core models on which simulation is performed by the multi-core simulator 121. For example, the shared translation block cache 122 may store translation blocks generated by the multi-core simulator 121. The shared translation block cache 122 may be commonly used for the plurality of core models. The multi-core simulator 121 may perform simulation on the plurality of core models with reference to the shared translation block cache 122.

In operation S140, the host processor 110 may translate the target instruction 123 with the multi-core simulator 121 to generate a translation block. The generated translation block may be stored in the shared translation block cache 122. For example, the at least one target instruction 123 may be translated to one translation block. The multi-core simulator 121 may figure out a function of the target instruction 123 and generate the translation block through a disassemble process. The translation block may be configured with an instruction set used in the host processor 110. Accordingly, the translation block may be rapidly executed in the host processor 110.

Before translating the target instruction 123, the multi-core simulator 121 checks whether a translation block corresponding to the target instruction 123 desired to execute exists in the shared translation block cache 122. When the translation block corresponding to the target instruction 123 exists in the shared translation block cache 122, the multi-core simulator 121 may use a corresponding translation block, needless to translate the target instruction 123. When the translation block corresponding to the target instruction 123 does not exist in the shared translation block cache 122, the multi-core simulator 121 may translate the target instruction 123 and store the corresponding translation block in the shared translation block cache 122. In addition, the multi-core simulator 121 may share a shared translation block cache for a plurality of core models. Accordingly, when each of the core models performs the same target instruction 123, the multi-core simulator 121 may use a translation block generated for one of the core models in other core models. When the shared translation block cache 122 is used, a simulation time may be shortened than a case where the multi-core simulator 121 individually uses a translation block cache in each core model.

In operation S150, the host processor 110 may use translation blocks stored in the shared translation block cache 122 to perform simulation on the plurality of core models through the multi-core simulator 121. For example, the multi-core simulator 121 may perform simulation on the plurality of core models. The multi-core simulator 121 may include modeling information on performance and characteristics of each of the core models. The multi-core simulator 121 may execute a translation block corresponding to the target instruction 123 in a target core.

Figure 3:
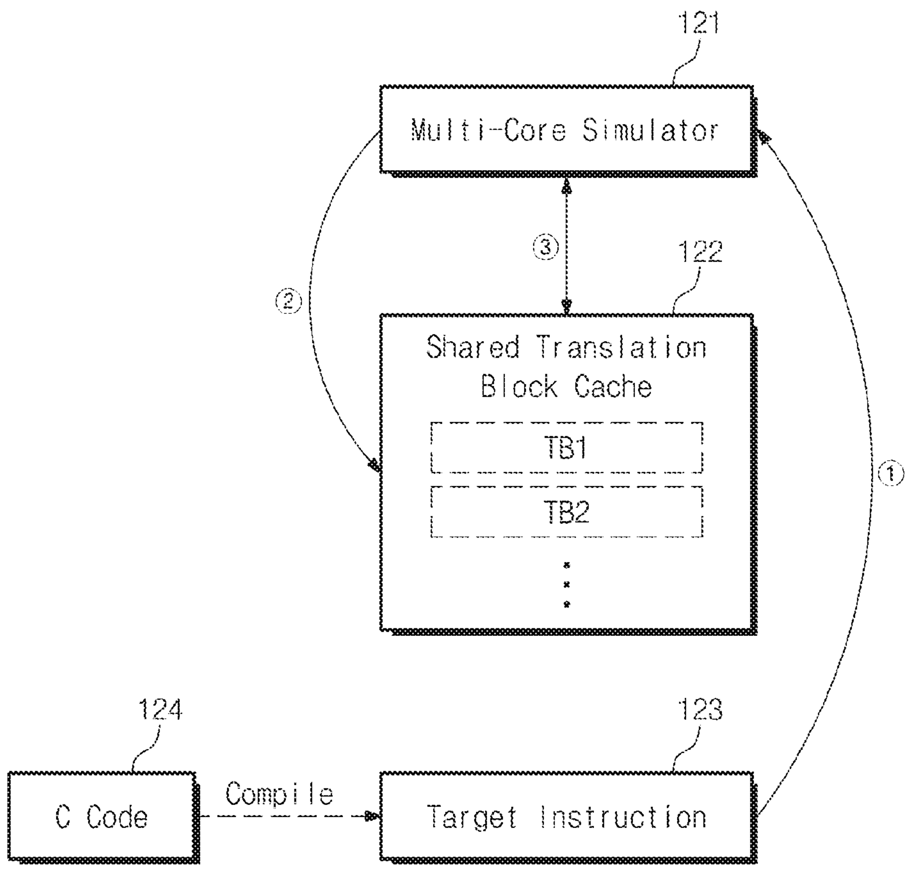
FIG. 3 illustrates a management method of the shared translation block cache of FIG. 1.

FIG. 3 illustrates a management method of the shared translation block cache of FIG. 1. Referring to FIGS. 1 and 3, a multi-core simulation system 100 may load, in the working memory 120, the multi-core simulator 121, the shared translation block cache 122, and the target instruction 123.

The multi-core simulation system 100 may receive C code 124 for simulating the plurality of core models. For example, C code 124 may be input by a user through the input/output device 130. In addition, C code 124 may be pre-stored in the storage device 140.

The multi-core simulation system 100 may compile C code 124 to convert C code 124 to the target instruction 123. For example, the host processor 110 may convert C code 124 to the target instruction 123 and store the target instruction

123 in the working memory 120. The target instruction 123 may be a file of a binary code type.

The multi-core simulation system 100 may execute the multi-core simulator 121. For example, the multi-core simulator 121 may be a program for simulating a plurality of core models. In other words, the multi-core simulator 121 may include a simulation model for the plurality of core models. The multi-core simulator 121 may read an instruction set to be executed in a target core from the target instruction 123 of a binary code type (operation ①). The multi-core simulator 121 may search the shared translation block cache 122 for a translation block corresponding to the target instruction 123 on the basis of the instruction set of the target core (operation ②). When there is the translation block corresponding to the target instruction 123 in the shared translation block cache 122, the multi-core simulator 121 may execute the translation block in a target core corresponding thereto. When there is not the translation block corresponding to the target instruction 123, the multi-core simulator 121 may perform a disassemble process on the target instruction 123 to generate a translation block and store the translation block in the shared translation block cache 122 (operation ③).

The translation blocks TB1 and TB2 may be configured with instruction sets used in the host processor 110. The multi-core simulator 121 may store the translation blocks TB1 and TB2 and use the stored translation blocks TB1 and TB2 to perform simulation later on the same target instruction 123. Accordingly, a simulation time may be shortened than a case where the multi-core simulator 121 disassembles the target instruction 123 every time.

In addition, the multi-core simulation system 121 according to an embodiment of the inventive concept may share the shared translation block cache 122 among core models, which are to be simulation targets. Accordingly, a simulation time may be shortened than a case where the multi-core simulation system 121 allocates a translation block cache to each of the core models, which are to be the simulation targets.

Figure 4:
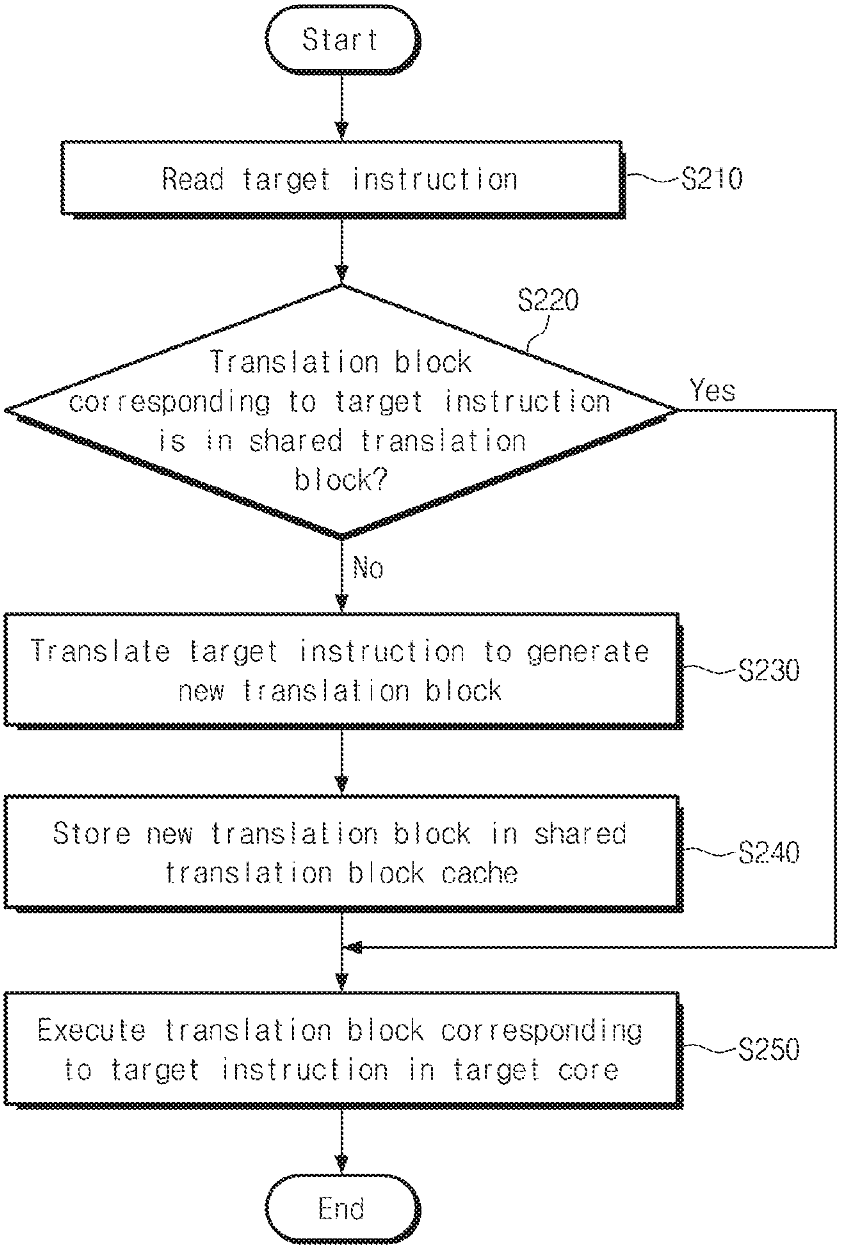
FIG. 4 is a flowchart illustrating a management method of the shared translation block cache of FIG. 3.

FIG. 4 is a flowchart illustrating a management method of the shared translation block cache of FIG. 3. Referring FIGS. 3 and 4, the multi-core simulator 121 may determine whether to perform a disassemble process on the target instruction 123 according to whether a translation block corresponding to the target instruction 123 is in the shared translation block cache 122.

In operation S210, the multi-core simulator 121 may read the target instruction to be performed in the target core. For example, the multi-core simulator 121 may read a binary code of the target instruction 123 to calculate a feature value for searching for a translation block corresponding to the target instruction 123.

In operation S220, the multi-core simulator 121 may search the shared translation block cache 122 for the translation block corresponding to the target instruction 123. For example, the multi-core simulator 121 may use the feature value calculated in step S210 to search for the translation block corresponding to the target instruction 123. When the translation block corresponding to the target instruction 123 exists in the shared translation block cache 122, the procedure moves to operation S250. When the translation block corresponding to the target instruction 123 does not exist in the shared translation block cache 122, the procedure moves to operation S230.

In operation S230, the multi-core simulator 121 may generate a translation block corresponding to the target instruction 123. For example, the target instruction 123 may be formed of a binary code. The multi-core simulator 121 may convert the target instruction 123 to a translation block configured with the instruction set of the host processor 110 through a disassemble process.

In operation S240, the multi-core simulator 121 may store a newly generated translation block in the shared translation block cache 122. For example, the newly generated translation block may be generated to be executed in any one of the core models. However, when the same target instruction 123 is executed later in any one of the remaining core models, an already generated translation block may be used for simulating any one of the remaining core models.

In operation S250, the multi-core simulator 121 may execute, in a target core, a translation block corresponding to the target instruction 123 having been read in operation S210. For example, the translation block executed in the target core may be a translation block found in the shared translation block cache 122 or a newly generated translation block. At this point, when the executed translation block is found in the shared translation block cache 122, the multi-core simulation system 100 may shorten a simulation time.

According to the above-description, the multi-core simulation system 100 according to an embodiment of the inventive concept may share the shared translation block cache 122 among core models, which are to be simulation targets. Accordingly, a simulation time may be shortened than a case where the multi-core simulation system 100 allocates a translation block cache to each of the core models, which are to be the simulation targets.

Figure 5:
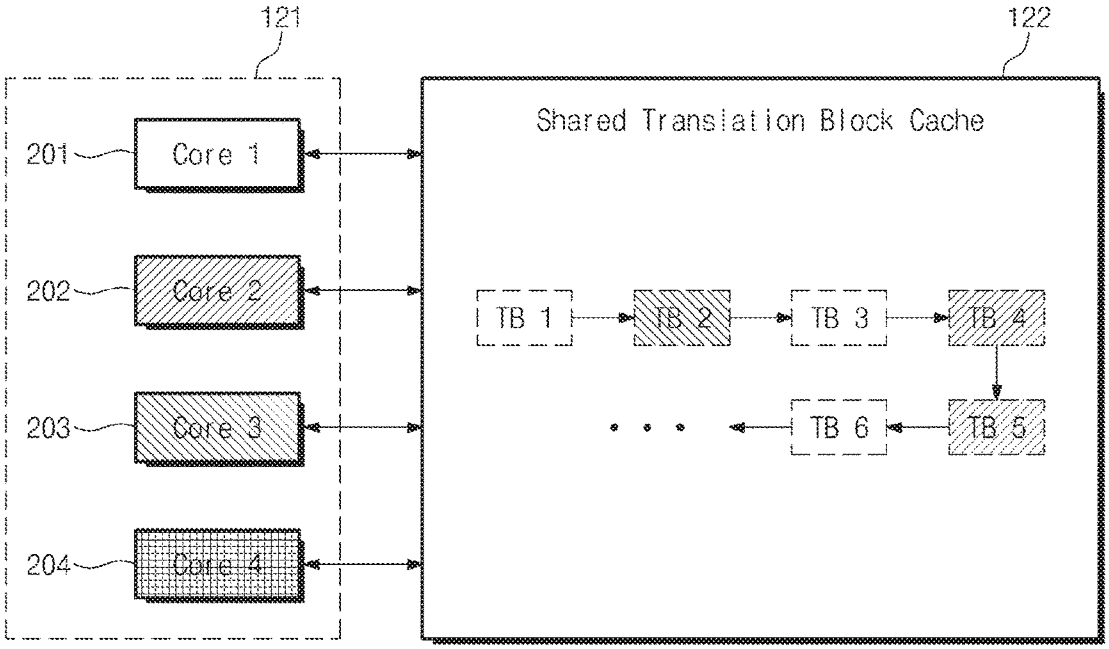
FIG. 5 illustrates a method for storing a shared translation block cache according to an embodiment of the inventive concept.

FIG. 5 illustrates a method for storing a shared translation block caches according to an embodiment of the inventive concept. Referring to FIG. 5, the multi-core simulator 121 may include a plurality of core models 201 to 204. The core models 201 to 204 may share one shared translation block cache 122.

In FIG. 5, the translation blocks TB1 to TB6 may be managed with a linked list. For example, the translation blocks TB1 to TB6 may be stored in a generation order. The multi-core simulation 121 sequentially compares a feature value of the target instruction 123 to be executed in each of core models 201 to 204 with feature values of the translation blocks TB1 to TB 6 to find the translation block corresponding to the target instruction 123.

The translation blocks TB1 to TB6 may be generated as necessary in the core models 201 to 204. For example, the translation blocks TB1, TB3, and TB6 are generated to be executed in a first core model 201. The translation block TB2 is generated to be executed in a third core model 203. The translation blocks TB4 and TB5 are generated to be executed in a second core model 202. However, all the translation blocks TB1 to TB6 may be used in the core models 201 to 204 after being generated.

Figure 6:
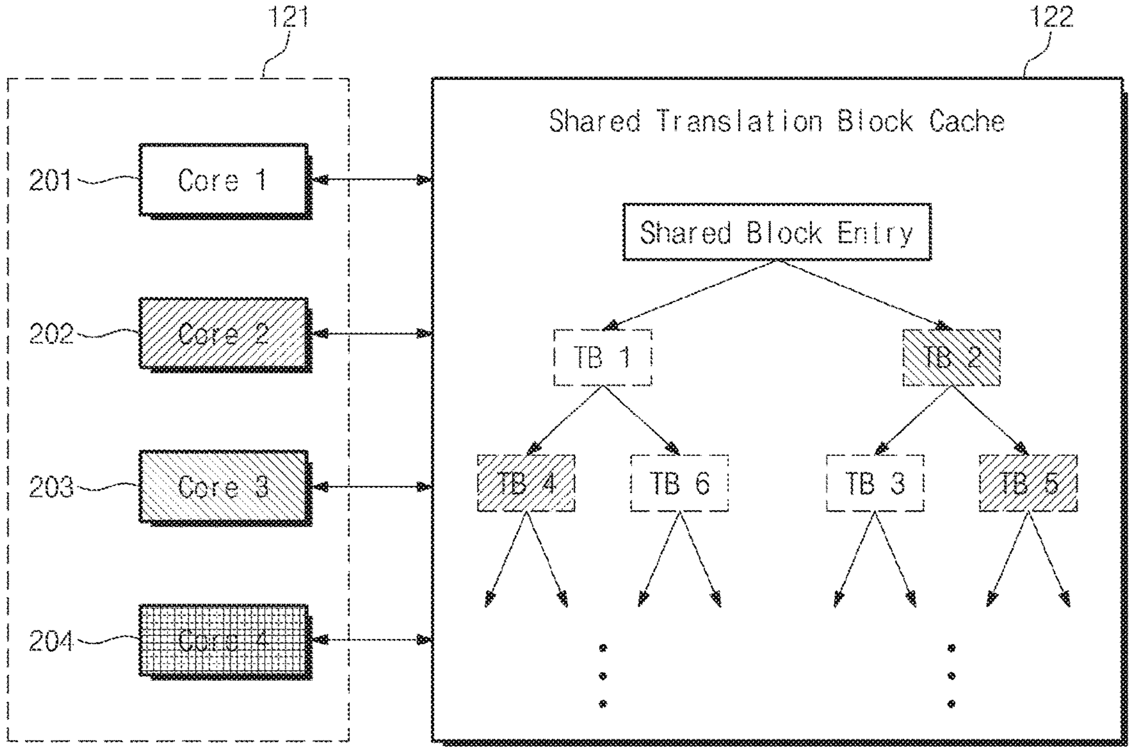
FIG. 6 illustrates a method for storing a shared translation block cache according to another embodiment of the inventive concept.

FIG. 6 illustrates a method for storing a shared translation block caches according to another embodiment of the inventive concept. Referring to FIG. 6, the multi-core simulator 121 may include the plurality of core models 201 to 204. The core models 201 to 204 may share one shared translation block cache 122.

In FIG. 6, the translation blocks TB1 to TB6 may be managed on the basis of a binary tree data structure. For example, the translation blocks TB1 to TB6 may be stored on the basis of feature values of the target instruction 123. The multi-core simulator 121 compares a feature value of the target instruction 123 to be executed in each of core models 201 to 204 with the feature values of the translation blocks TB1 to TB 6 to search a binary tree. A translation block entry may be generated according to a prescribed criterion.

For example, the feature value of the translation block TB1 may be smaller than that of the translation block TB2. Translation blocks connected to the translation block TB1 may have feature values smaller than that of the translation block TB2. Translation blocks connected to the translation block TB2 may have feature values greater than that of the translation block TB1. The feature value of the translation block TB4 may be smaller than that of the translation block TB6. The feature value of the translation block TB3 may be smaller than that of the translation block TB5. However, such a binary tree generation method is just an example and is not limited thereto.

The translation blocks TB1 to TB6 may be generated as necessary in the core models 201 to 204. For example, the translation blocks TB1, TB3, and TB6 are generated to be executed in the first core model 201. The translation block TB2 is generated to be executed in the third core model 203. The translation blocks TB4 and TB5 are generated to be executed in the second core model 202. However, all the translation blocks TB1 to TB6 may be used in the core models 201 to 204 after being generated. When the shared translation block cache 122 is managed on the basis of the binary tree, and a translation block corresponding to the target instruction 123 exists in the shared translation block cache 122, the translation block corresponding to the target instruction 123 may be found by searches of maximum $\log_2 N$ times, where N is the number of total translation blocks.

According to embodiments of the inventive concept, a shared translation block cache-based multi-core simulation system and method may be provided which share a shared translation block cache for storing a translation block among a plurality of core models to rapidly simulate the plurality of core models.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A multi-core simulation method of a multi-core simulation system, which comprises a multi-core simulator configured to perform simulation on a plurality of core models and a host processor configured to perform the multi-core simulator, the multi-core simulation method comprising:
- allocating, to a working memory, a shared translation block cache commonly used for the plurality of core models;
- reading a first target instruction to be performed in a first core model;
- generating a first translation block corresponding to the first target instruction and provided with an instruction set used in the host processor;
- performing the first translation block in the first core model after the first translation block is stored in the shared translation block cache;
- reading a second target instruction to be performed in a second core model;
- searching the shared translation block cache for a translation block including same content as that of the second target instruction; and
- performing the first translation block in the second core model when the first target instruction includes same content as that of the second target instruction.

2. The multi-core simulation method of claim 1, further comprising:
- reading a third target instruction to be performed in a third core model;
- searching the shared translation block cache for a translation block including same content as that of the third target instruction;
- generating a second translation block provided with an instruction set used in the host processor when a translation block including same content as that of the third target instruction is not in the shared translation block cache; and
- performing the second translation block in the third core model after the second translation block is stored in the shared translation block cache.

3. The multi-core simulation method of claim 1, wherein in the reading of the first and second target instructions, the multi-core simulator calculates feature values respectively corresponding to the first and second target instructions.

4. The multi-core simulation method of claim 3, wherein the multi-core simulator searches the shared translation block cache for a translation block corresponding to each target instruction on a basis of the feature values.

5. The multi-core simulation method of claim 1, wherein the shared translation block cache stores the translation blocks in a linked list according to an input sequence.

6. The multi-core simulation method of claim 1, wherein the shared translation block cache stores the translation blocks in a binary tree structure on the basis of feature values respectively corresponding to the target instructions.

7. The multi-core simulation method of claim 1, wherein the first and second target instructions are configured with a binary code.

8. The multi-core simulation method of claim 1, wherein the first target instruction is translated to the first translation block provided with an instruction set used in the host processor through a disassemble process.

9. The multi-core simulation method of claim 1, wherein the first and second target instructions are generated by the host processor which compiles C code to be executed in the first and second core models.

10. A multi-core simulation system comprising:
- a host processor configured to execute a multi-core simulator configured to simulate a plurality of core models; and
- a working memory in which target instructions performed in the multi-core simulator and the core models are loaded and which includes a shared translation block cache commonly used in the core models,
- wherein the shared translation block cache stores translation blocks generated by translating the target instructions and provided with instruction sets used in the host processor, and
- the multi-core simulator searches the shared translation block cache for a first translation block corresponding to the first target instruction when the first target instruction is performed in any one of the core models, and executes the first translation block without translating the first target instruction when the first translation block exists.

11. The multi-core simulation system of claim 10, wherein the multi-core simulator translates the first target instruction to the first translation block and stores the first translation block in the shared translation block cache when the first translation block does not exist in the shared translation block cache.

12. The multi-core simulation system of claim 10, wherein the multi-core simulator calculates a feature value from the first target instruction and searches the shared translation block cache for the first translation block on a basis of the feature value.

* * * * *